US007999738B2

(12) United States Patent
Melconian et al.

(10) Patent No.: US 7,999,738 B2
(45) Date of Patent: Aug. 16, 2011

(54) SYSTEMS AND METHODS FOR TRACKING A REMOTE SOURCE AND ORIENTATION CONTROL

(76) Inventors: Arsen Melconian, Northridge, CA (US); Steven Gregory Ow, Santa Rosa Valley, CA (US); Daniel Lawrence Cordell, Ventura, CA (US); Amedeo Antonio Mazzilli, Valencia, CA (US)

( * ) Notice: Subject to any disclaimer, the term of this patent is extended or adjusted under 35 U.S.C. 154(b) by 0 days.

(21) Appl. No.: 12/783,443

(22) Filed: May 19, 2010

(65) Prior Publication Data
US 2011/0050487 A1    Mar. 3, 2011

Related U.S. Application Data

(60) Provisional application No. 61/179,642, filed on May 19, 2009.

(51) Int. Cl.
*G01S 5/02* (2010.01)
(52) U.S. Cl. ....................................................... 342/427
(58) Field of Classification Search .................. 342/427
See application file for complete search history.

(56) References Cited

U.S. PATENT DOCUMENTS

| 4,121,216 A * | 10/1978 | Bunch et al. | 342/424 |
| 4,489,313 A * | 12/1984 | Pfister | 340/540 |
| 4,658,256 A * | 4/1987 | Piele | 342/383 |
| 4,706,093 A * | 11/1987 | Groth, Jr. | 342/427 |
| 4,837,576 A * | 6/1989 | Schwarz | 342/77 |
| 5,912,642 A * | 6/1999 | Coffin et al. | 342/359 |
| 5,986,605 A * | 11/1999 | Priebe et al. | 342/427 |
| 6,178,140 B1 | 1/2001 | Schlieter | |
| 6,906,664 B2 * | 6/2005 | Tseng et al. | 342/357.36 |

FOREIGN PATENT DOCUMENTS

| EP | 0206359 | 12/1986 |
| EP | 0959367 | 11/1999 |

OTHER PUBLICATIONS

Abstract of EP 0206359 (Mönich, Dec. 30, 1986).
Abstract of EP 0959367 (Schlieter, Nov. 24, 1999).
International Search Report, PCT/US2010/035468, dated Sep. 28, 2010 (4 pages).

* cited by examiner

*Primary Examiner* — Thomas H Tarcza
*Assistant Examiner* — Frank McGue
(74) *Attorney, Agent, or Firm* — Finnegan, Henderson, Farabow, Garrett & Dunner, L.L.P.

(57) ABSTRACT

Systems and methods for tracking a remote source and monitoring and controlling the angular orientation of an antenna array, including a first antenna portion and a second antenna portion, are provided, including a sum-difference structure coupled to a first output of the first antenna portion and a second output of the second antenna portion, where the sum-difference structure provides both a sum power signal and a difference power signal, and where both the sum power signal and the difference power signal have associated RSSI values generated by an RSSI circuit. Systems and methods provided herein further include a sum-delta processor configured to utilize the RSSI values to generate an off-bore-sight angle of the antenna array relative to a position of a transmitting radiofrequency signal source.

75 Claims, 7 Drawing Sheets

SYSTEMS AND METHODS FOR TRACKING A REMOTE SOURCE AND ORIENTATION CONTROL

CROSS REFERENCE TO RELATED APPLICATIONS

This application claims the benefit of U.S. Provisional Application No. 61/179,642, filed May 19, 2009, the contents of which are incorporated herein by reference.

This application is related to co-pending U.S. application Ser. No. 12/770,700, filed Apr. 29, 2010, the contents of which are incorporated by reference, and which itself claims the benefit of U.S. Provisional Application No. 61/174,379 filed Apr. 30, 2009.

DESCRIPTION

Field

This disclosure relates to systems and methods for monitoring, testing, controlling, and adjusting the orientation of an assembly relative to a remote source of radio frequency radiation. Particular embodiments relate to such systems and processes for antenna assemblies affixed to vehicles, such as, for example, systems and processes for an antenna assembly affixed to an airplane. Further particular embodiments relate to systems and processes for monitoring, testing, controlling, and adjusting the alignment of a receive-only and/or a receive-and-transmit antenna assembly relative to a remote antenna assembly, such as a remote antenna assembly affixed to a communications satellite.

BACKGROUND

Antenna assemblies may be affixed to vehicles, such as airplanes, and configured to receive signals from a remote antenna assembly to provide services to the occupants of the vehicle during transit. For example, an antenna assembly may be configured to receive signals from a satellite. The satellite that is the source of the signals may be one that amplifies and redirects a received signal itself, or a satellite that intercepts a signal at a first frequency and retransmits at a second frequency. Particular examples of satellites that may be a source of signals to provide services include satellites associated with satellite radio services and satellites that offer broadcast television and pay-per-view channels. Such antenna assemblies configured to receive satellite radio and satellite television signals are conventionally non-transmitting antenna assemblies (i.e., a non-transmitting antenna assembly is one that is configured to receive signals from the remote antenna assembly, rather than being also configured to transmit signals back to the remote antenna assembly). When installed on an aircraft, such an antenna assembly may be used to provide in-flight entertainment services to airplane passengers.

In contrast, services offered to the occupants of a vehicle that offer two-way communications, such as receiving and sending emails, actively browsing the internet, or other forms of communication, and that are channeled through an antenna assembly that is affixed to a vehicle, require the antenna assembly to be configured to transmit signals to a remote antenna assembly.

The use of mobile antenna assemblies to transmit radiofrequency radiation to a remote target antenna assembly, such as a communications satellite in the Clarke belt, is regulated by the Federal Communications Commission (FCC). Exemplary regulation provides that earth stations on vessels (ESVs) that transmit in the 5925-6425 MHz (earth-to-space) frequency band to a geostationary satellite must maintain "a pointing error of less than 0.2° between the orbital location of the target satellite and the axis of the main lobe of the ESV antenna." 47 C.F.R. 25.221(a)(1)(ii)(A). If the pointing error exceeds plus or minus 0.2 degrees—such as may occur when an antenna assembly is in motion—it may be required that transmissions from the antenna assembly are halted. For example, FCC regulations state that "all emissions from the ESV shall automatically cease within 100 milliseconds if the angle between the orbital location of the target satellite and the axis of the main lobe of the ESV antenna exceeds 0.5°, and transmission will not resume until such angle is less than or equal to 0.2°." 47 C.F.R. 25.221(a)(1)(iii)(A). Halting transmissions between the antenna assembly and the radio signal source may incur service disruptions and, therefore, inconvenience aircraft passengers.

There is a need, accordingly, for a system and method that tracks a remote antenna assembly, and that tests, controls, and adjusts the alignment of an assembly (such as an antenna assembly) relative to the remote antenna assembly, such as a remote source of radiofrequency radiation.

SUMMARY

In one aspect, the present disclosure is directed to a method for monitoring angular orientation. The method can include acquiring a sum power signal from a sum combination of a first signal output of an antenna array and a second signal output of the antenna array, where the antenna array includes a first antenna portion and a second antenna portion, and where the first antenna portion is configured to couple to radiofrequency radiation transmitted from a transmitting radiofrequency signal source and provide a first signal output, and where the second antenna portion is configured to couple to radiofrequency radiation transmitted from the transmitting radiofrequency signal source and provide a second signal output. The method can also include acquiring a difference power signal from a difference combination of the first signal output of the antenna array and the second signal output of the antenna array. The method can also include deriving a first received signal strength indication value associated with the sum power signal and associated with approximately a first time and deriving a second received signal strength indication value associated with the difference power signal and associated with approximately the first time. The method can also include utilizing the first received signal strength indication value and the second received signal strength indication value to generate a first measure of an off-bore-sight angle of the antenna array relative to a position of the transmitting radiofrequency signal source at approximately the first time.

An additional aspect of the present disclosure is directed to a method of controlling angular orientation. The method can include monitoring angular orientation. The method can also include utilizing the first measure of the off-bore-sight angle of the antenna array relative to the position of the transmitting radiofrequency signal source at approximately the first time to generate radiofrequency steering instructions for an antenna motion controller, where the antenna motion controller is responsive to the radiofrequency steering instructions, and is further configured to cause the antenna array to exhibit a provisional off-bore-sight angle relative to the position of the transmitting radiofrequency signal source that is different from the off-bore-sight angle of the antenna array relative to the position of the transmitting radiofrequency signal source at approximately the first time.

An additional aspect of the present disclosure is directed to an angular orientation system. The system can include an antenna array, which can include a first antenna portion and a second antenna portion, where the first antenna portion is configured to couple to radiofrequency radiation transmitted from a transmitting radiofrequency signal source and to provide a first signal output; and where the second antenna portion is configured to couple to radiofrequency radiation transmitted from the transmitting radiofrequency signal source and to provide a second signal output. The system can also include a sum-difference structure coupled to the first output and the second output, the sum-difference structure configured to provide a sum power signal and a difference power signal. The system can also include an RSSI circuit configured to generate a first received signal strength indication value associated with the sum power signal, the RSSI circuit further configured to generate a second received signal strength indication value associated with the difference power signal. The system can also include a sum-delta processor configured to utilize the first received signal strength indication value and the second received signal strength indication value to generate a first measure of an off-bore-sight angle of the antenna array relative to a position of the transmitting radiofrequency signal source.

An additional aspect of the present disclosure is directed to a further angular orientation system. The system can include an antenna array comprising a first antenna portion and a second antenna portion, where the first antenna portion and the second antenna portion are configured to couple to radiofrequency radiation transmitted from a transmitting radiofrequency signal source, and where the radiofrequency radiation includes a first component of radiofrequency radiation polarized in a first direction and a second component of radiofrequency radiation polarized in a second direction, and where a first signal output is associated with the first component of radiofrequency radiation polarized in the first direction coupled to the first antenna portion, and where a second signal output is associated with the first component of radiofrequency radiation polarized in the first direction coupled to the second antenna portion, and where a third signal output is associated with the second component of radiofrequency radiation polarized in the second direction coupled to the first antenna portion, and where the fourth signal output is associated with the second component of radiofrequency radiation polarized in the second direction coupled to the second antenna portion. The system can also include a first sum-difference structure coupled to the first output and the second output, where the first sum-difference structure is configured to provide a first sum power signal and a first difference power signal. The system can also include a second sum-difference structure coupled to the third output and the fourth output, where the second sum-difference structure is configured to provide a second sum power signal and a second difference power signal. The system can also include a polarization controller configured to select at least one of the first sum power signal and the second sum power signal to provide a selected sum power signal, the polarization controller further configured to select at least one of the first difference power signal and the second difference power signal to provide a selected difference power signal. The system can also include an RSSI circuit configured to generate a first received signal strength indication value associated with the selected sum power signal, and the RSSI circuit is further configured to generate a second received signal strength indication value associated with the selected difference power signal. The system can also include a sum-delta processor configured to utilize the first received signal strength indication value and the second received signal strength indication value to generate a first measure of an off-bore-sight angle of the antenna array relative to a position of the transmitting radiofrequency signal source.

An additional aspect of the present disclosure is directed to a computer-readable storage medium including instructions, executable by a processor, for performing a method of monitoring angular orientation of an antenna array. The antenna array comprises a first antenna portion and a second antenna portion, where the first antenna portion is configured to couple to radiofrequency radiation transmitted from a transmitting radiofrequency signal source and provide a first signal output, and where the second antenna portion is configured to couple to radiofrequency radiation transmitted from the transmitting radiofrequency signal source and provide a second signal output. The method of monitoring angular orientation may include acquiring a sum power signal from a sum combination of the first signal output of the antenna array and the second signal output of the antenna array, acquiring a difference power signal from a difference combination of the first signal output of the antenna array and the second signal output of the antenna array, deriving a first received signal strength indication value associated with the sum power signal and associated with approximately a first time, deriving a second received signal strength indication value associated with the difference power signal and associated with approximately the first time, utilizing the first received signal strength indication value and the second received signal strength indication value to generate a first measure of an off-bore-sight angle of the antenna array relative to a position of the transmitting radiofrequency signal source at approximately the first time.

An additional aspect of the present disclosure is directed to a further computer-readable storage medium including instructions, executable by a processor, for performing a method of controlling angular orientation. The antenna array can be coupled to an antenna motion controller, responsive to radiofrequency steering instructions, where the antenna motion controller is further configured to cause the antenna array to exhibit a provisional off-bore-sight angle relative to the position of the transmitting radiofrequency signal source that is different from the off-bore-sight angle of the antenna array relative to the position of the transmitting radiofrequency signal source at approximately the first time. The method may include monitoring angular orientation. The method may also include utilizing the first measure of the off-bore-sight angle of the antenna array relative to the position of the transmitting radiofrequency signal source at approximately the first time to generate radiofrequency steering instructions for the antenna motion controller.

Additional objects and advantages will be set forth in part in the description which follows, being apparent from the description of or can be learned by practice of the disclosed embodiments. The features and advantages will be realized and attained by means of the elements and combinations particularly pointed out in the appended claims.

It is to be understood that both the foregoing general description and the following detailed description are exemplary and explanatory only and are not restrictive of the scope of the inventions, as claimed.

BRIEF DESCRIPTION OF THE DRAWINGS

The accompanying drawings, which are incorporated in and constitute a part of this specification, illustrate embodiments and, together with the description, serve to explain the features, advantages, and principles of the disclosed embodiments.

DETAILED DESCRIPTION

Reference will now be made in detail to the present exemplary embodiments, examples of which are illustrated in the accompanying drawings. Wherever possible, the same reference numbers will be used throughout the drawings to refer to the same or like parts.

Figure 1:
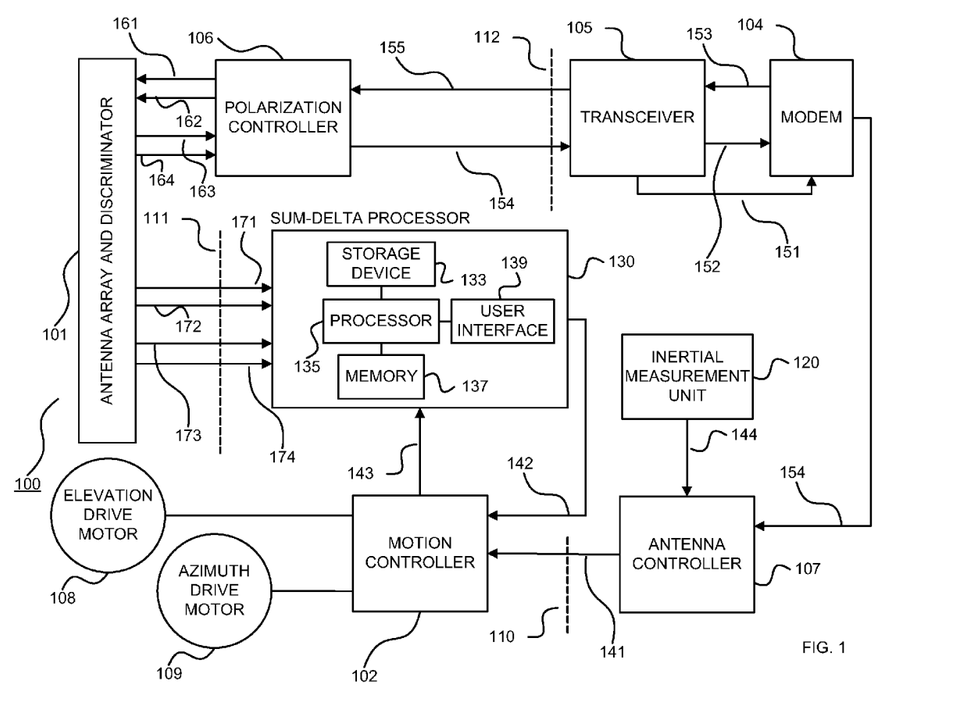
FIG. 1 is a schematic diagram of a system environment according to an embodiment of the disclosure.

FIG. 1. is a schematic diagram of a system 100 according to an exemplary embodiment of the present disclosure. An exemplary embodiment of system 100 can be configured to control and adjust the angular orientation of antenna array 101 configured to communicate with a communication source, such as, for example, an earth-orbiting satellite, for instance, a geostationary satellite. Antenna array 101 may be affixed to any suitable stationary, mobile, or portable vehicle. In an exemplary embodiment, antenna array 101 may be affixed on a vehicle such as, for example, an automobile, bus, airplane, sea vessel, train, or other mode of conveyance. According to one embodiment, antenna array 101 may be located aboard a commercial airplane and configured to support high-speed wireless voice, video, radio, and/or data communication for a plurality of occupants located therein. In one embodiment, antenna array 101 may include a plurality of array elements, such as, for example, antenna horns. The plurality of array elements may be arranged in any pattern and using any predetermined spacing between elements. According to one embodiment, antenna array 101 may be generally configured with horn antennas in a specific phase relationship causing a shaping of the main beam and side lobes. According to a further embodiment, antenna array 101 is separated into two or more even integer sub-arrays that can form one or more nulls with a plurality of phasing methods.

In one embodiment, antenna array 101 is configured to detect, receive, collect, or otherwise sense electromagnetic energy that is incident upon array elements as well as to transmit to a remote antenna assembly—as may be located on a satellite. In an embodiment consistent with the disclosure, antenna array 101 may be a Satellite Broadband Antenna Assembly ("SBAA"). For example, antenna assembly 101 may receive radio frequency (RF) signals transmitted by a remote source located at elevation θ and azimuth φ, such as a satellite. As used herein, the off-bore-sight angle ("OBA") of antenna array 101 is the angular difference between the orbital location of the remote source (as defined by elevation and azimuth) and the axis of the main lobe of antenna array 101. Additionally, antenna array 101 may also receive other RF signals from undesirable sources, including, for example, signals from other communication systems or energy generated by noise sources. Thus, to track signals received from an intended remote source while antenna subsystem 101 is moving, the RF signals received by antenna array 101 may be further analyzed and processed.

In an exemplary embodiment, the angular orientation of antenna array 101 is under the control of motion controller 102 (which may be configured to operate elevation drive motor 108 and azimuth drive motor 109). Motion controller 102 is further coupled with antenna controller 107, which may acquire orientation values from inertial measurement unit 120 ("IMU 120"). In an embodiment, motion controller 102 receives inertial steering instructions over channel 141 from antenna controller 107, which, in turn, receives inertial attitude and location information from IMU 120 over channel 144 (where IMU 120 in an exemplary embodiment may be an Air Data Inertial reference Unit, ADIRU). Accordingly, in an embodiment, antenna controller 107 and/or motion controller 102 may receive information from IMU 120 in order to control and/or maintain the angular orientation of antenna array 101 so as to optimize the ability of the system to receive signals from the desired remote source and to suppress or minimize the effect of other undesired signals. Also, antenna array 101 may be coupled to transceiver 105, which may process the signals received by antenna array 101 for further processing and/or use, as by modem 104. Exemplary transmit channels from modem 104 through transceiver 105 and polarization controller 106 include channels 153, 155, 161, and 162. Exemplary receive channels from array 101 through polarization controller 106 and transceiver 105 to modem 104 include channels 163, 164, 154, and 152. (Channel 151 as depicted may be a 10 MHz reference signal). Channels 161, 162, 163, and 164 may include RF signals, and channels 152 and 153 may include intermediate frequency signals. Channels 161 and 163, moreover, may be associated with Vertical (V) polarization, and channels 162 and 164 may be associated with Horizontal (H) polarization. Furthermore, according to an exemplary embodiment, information associated with signal quality may be provided to antenna controller 107 through channel 154. Further still, in an exemplary embodiment, system 100 may include dual RF rotary joint 112 and slip ring 110. For example, according to an embodiment, slip ring 110 may allow for multiplexing a plurality of digital signals and D.C. power through a rotating azimuth platform. Further still, according to an embodiment, dual RF rotary joint 112 may be coaxially mounted in slip ring 110 to provide the antenna array the transmit signal from transceiver 105 and to provide the receive signal to modem 104.

In an exemplary embodiment, IMU 120 is associated with the vehicle and is configured to detect, for example, changes in the vehicle's geographic position, velocity (speed and direction of movement), and orientation (rotation about an axis, i.e., yaw, roll, and pitch). When the vehicle is in movement, antenna controller 107 and/or motion controller 102 may use information provided by IMU 120 to orient antenna array 101 relative to the remote communications source. Particular embodiments of the disclosure are directed to correcting errors in angular orientation of antenna array 101. Such angular orientation errors may be due to, for example, the location of IMU 120 relative to antenna array 101 and/or misalignments between IMU 120 and the vehicle. Further still, and even in the absence of the above sources of error, IMU 120 may inherently suffer from drift errors, which may affect any determination of antenna array 101 orientation that is relied upon by antenna controller 107 and motion controller 102.

In an exemplary embodiment of system 100, antenna array 101 is configured to communicate with sum-delta processor 130. Sum-delta processor 130 may embody any suitable microprocessor-based system capable of being programmed to monitor, record, analyze, process, and/or manipulate information that it acquires from antenna array 101. Without limitation, sum-delta processor 130 may embody a conventional personal computer or workstation. Sum-delta processor 130 may include one or more hardware and/or software components configured to execute computer-executable instructions and/or software programs. Sum-delta processor 130 may include one or more hardware components such as, for example, processor 135, memory 137 (random access memory (RAM), read-only memory (ROM)), storage device 133, interface 139, and one or more input/output (I/O) device. Alternatively and/or additionally, sum-delta processor 130 may include one or more software components such as, for example, a computer-readable medium including computer-executable instructions for performing methods consistent with certain disclosed embodiments. In an embodiment consistent with the disclosure, sum-delta processor 130 acquires signals derived from RF power values from antenna array 101.

As indicated in FIG. 1 in an exemplary embodiment of system 100, sum-delta processor 130 is also communicable with motion controller 102. A measure of OBA and/or associated RF steering instructions may be provided to motion controller 102 through channel 142. Further still, information associated with inertial steering instructions may be provided to sum-delta processor 130 by motion controller 102 through channel 143. Interface 111 is an interface between antenna array 101 and sum-delta processor 130. According to one embodiment, measurements of RF signals received by antenna array 101 are acquired while the vehicle is in motion. As will be explained in more detail below, these measurements may include measurements on sum and difference values of the signal power received by antenna array 101. These measurements may be used to perform calculations for determining whether antenna array 101 is optimally aligned relative to the remote source.

Sum-delta processor 130 may generate an error magnitude for the OBA. In an embodiment, the rate outputs of IMU 120 may be used by sum-delta processor 130 to determine the direction of the error. From the direction and magnitude information, instructions may be generated for the azimuth axis. In an embodiment, and because the elevation axis associated with antenna array 101 may have a wider beamwidth and reduced pointing requirements, elevation drive 108 may be driven from orientation values generated by IMU 120 alone.

The antenna configuration of antenna array 101 may be based on a flat aperture array antenna. It may be further configured to develop sum and delta discriminant signals for the reception paths for either horizontal or vertical polarization, as discussed further herein. In an embodiment consistent with FIG. 1, existing interfaces may be preserved.

As indicated above, sum-delta processor 130 may generate an OBA associated with the satellite RF signals. A calibration calculation may be used by sum-delta processor 130 to convert the OBA into an azimuth steering error angle (i.e., a target angle) which may be used to correct the commands to azimuth drive 109. As has been discussed, in one embodiment, elevation drive 108 may be controlled directly from the inertial measurements from IMU 120 and a steering solution developed in antenna controller 107.

As depicted in FIG. 1, sum-delta processor 130 may accept four RF signals over channels 171, 172, 173, and 174. In an embodiment consistent with the disclosure, received signals with Vertical (V) polarization may be received over 171 and 172. Further, received signals with Horizontal (H) polarization may be received over 173 and 174. Further still, channels 171 and 173 may be associated with "sum" signals from two portions of antenna array 101, and channels 172 and 174 may be associated with "difference" signals from two portions of antenna array 101. Consistent with an embodiment, sum-delta processor 130 may down select the received signals depending on the polarization of the designated remote source (i.e., the satellite). Where the RF band received by antenna array 101 is in the Ku-band, the signals are may be converted to an IF at 70 MHz with a bandwidth of 4 MHz.

Figure 2:
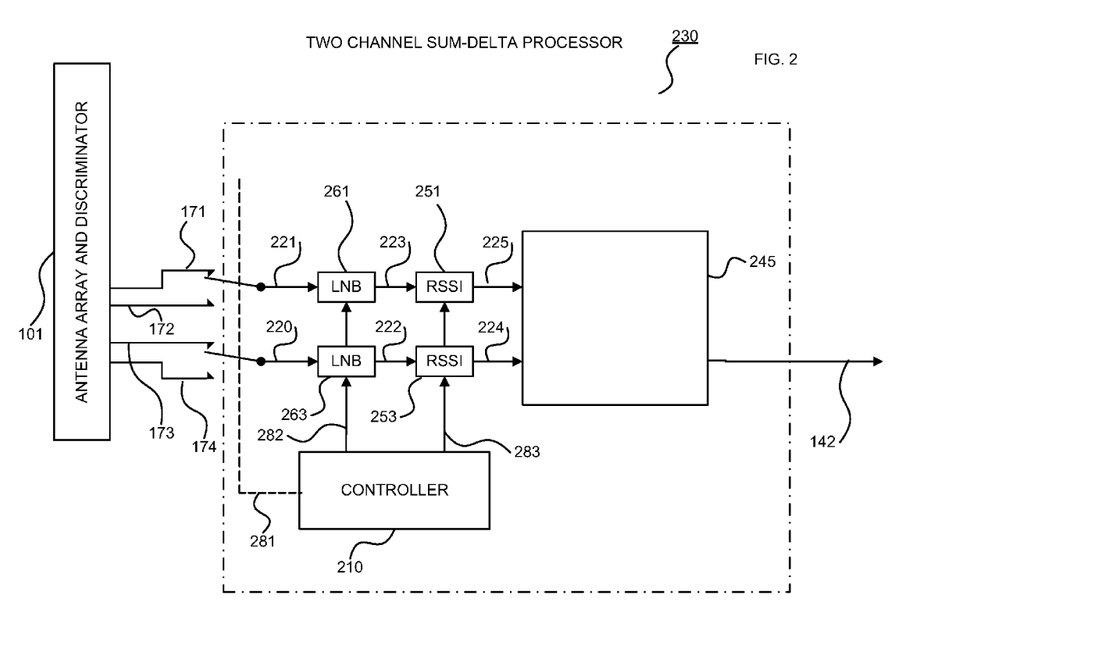
FIG. 2 is a schematic diagram of one embodiment of a portion of a sum-delta processor consistent with the present disclosure.
Figure 3:
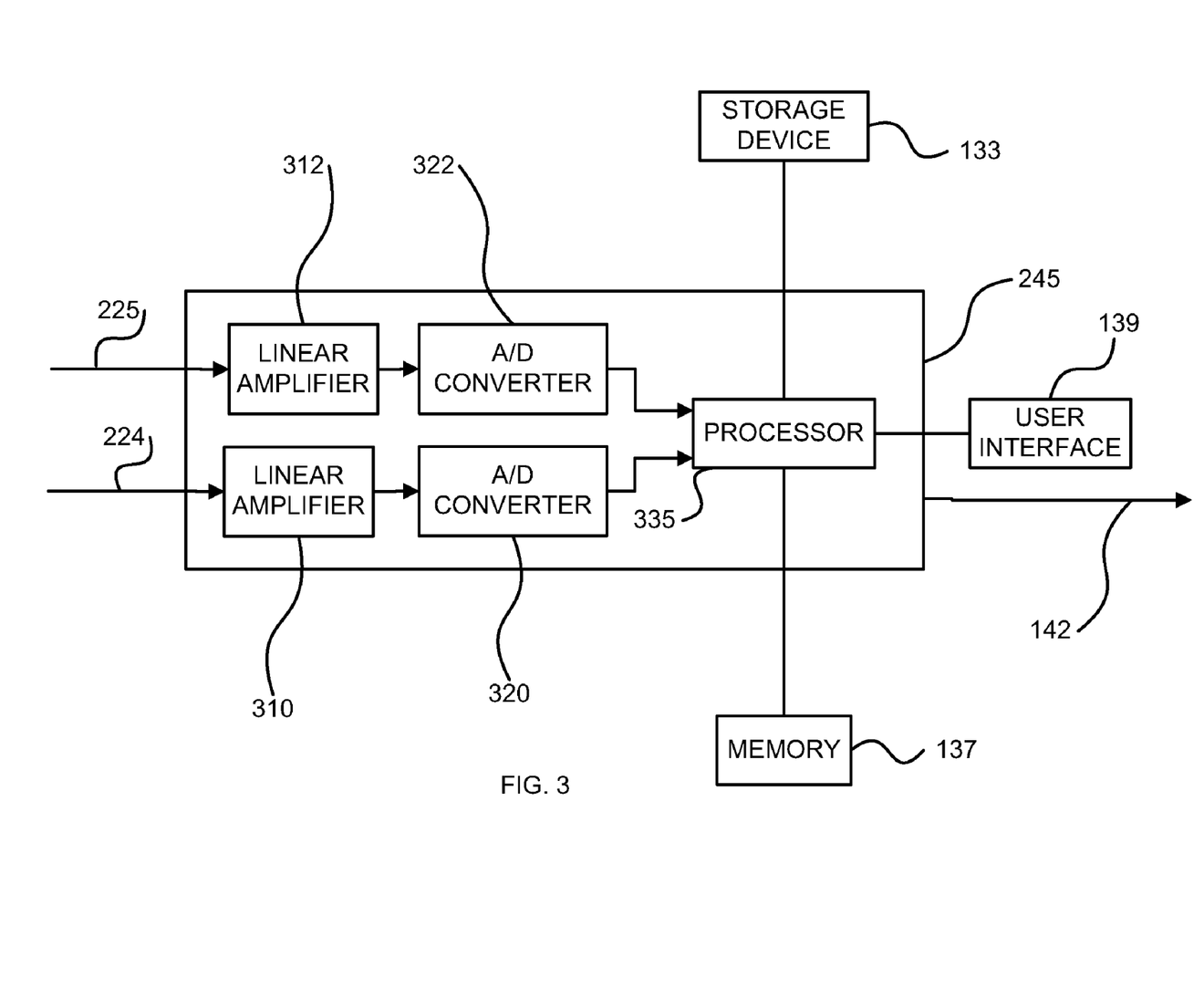
FIG. 3 is a schematic diagram of a portion of two channel sum-delta processor consistent with the environment depicted in FIG. 2.

FIG. 2 is a schematic diagram of one embodiment of a portion of a sum-delta processor consistent with the present disclosure. Specifically, two-channel sum-delta processor 230, including the RF-front end, are depicted in schematic form. RF channels 171, 172, 173, and 174, as described in connection with FIG. 1, are depicted as outputs from antenna array 101. Controller 210 operates switch 221 and 220 to select a specific polarization channel as output from antenna array 101. For example, in an embodiment, channels 171 and 173 are associated with Horizontal (H) polarization, and channels 172 and 174 are associated with Vertical (V) polarization. Moreover, channels 171 and 172 are associated with a sum operation on two portions of antenna array 101, and channels 173 and 174 are associated with a difference operation on the two portions of antenna array 101. In one embodiment, low-noise block 261 and low-noise block 263 convert the RF signals in the Ku-band that arrive over channels 221 and 220 to signals in the L-Band. Furthermore, in an embodiment, controller 210 selects a band associated with channels 222 and 223. Further still, in an embodiment consistent with the disclosure, RSSI circuit 251 and RSSI circuit 253 generate respective RSSI values associated with the sum power values and the difference power values for input into processor 245. Controller 210 may also select a frequency associated with RSSI circuit 251 and RSSI circuit 253. Similar to sum-delta processor 130 described in connection with FIG. 1, two-channel sum-delta processor 230 provides an OBA value and direction over channel 142. Processor 245 is depicted as providing the specific output over channel 142. While the exemplary embodiment depicted in FIG. 2 is shown with separate LNB frequency conversion stages, an embodiment consistent with the disclosure may be implemented as well with LNB 261 and LNB 263 combined with RSSI circuit 251 and RSSI circuit 253, respectively. Consistent with an embodiment, digital computation may create the ratios of the difference RSSI values divided by sum RSSI values and the computed error angle. Consistent with one embodiment, FIG. 3 is a digital processor block diagram of processor 245. Consistent with one embodiment of the disclosure, memory 137 (random access memory (RAM), read-only memory (ROM)), storage device 133, interface 139, and one or more input/output (I/O) device may communicate with digital processor 335.

As indicated in FIG. 1, antenna array 101 may supply the sum and difference outputs through channels 171, 172, 173, and 174. A particular embodiment is depicted in FIG. 4, discussed below.

Figure 4:
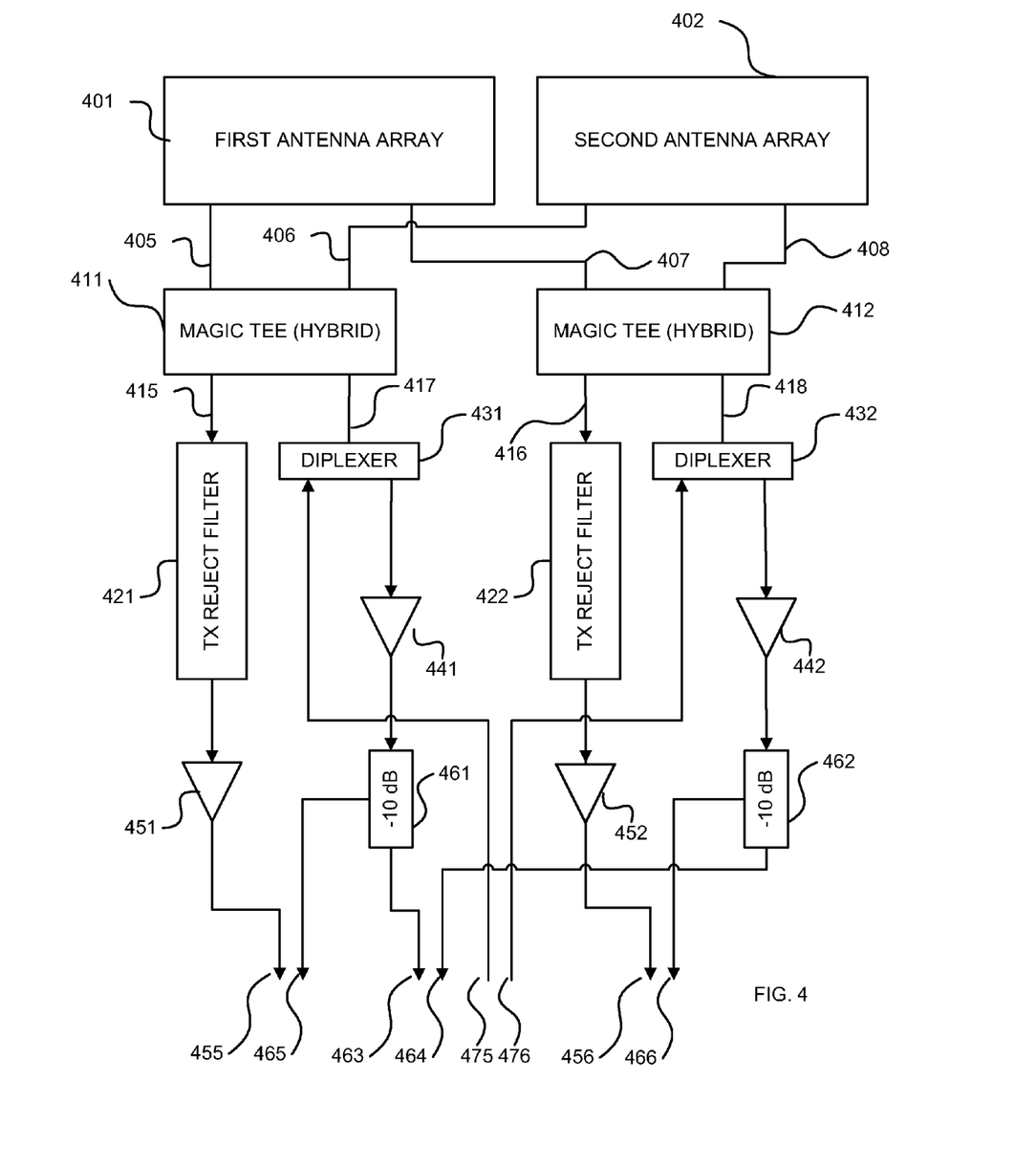
FIG. 4 is a schematic diagram of an antenna array interface and discriminator consistent with the present disclosure.

FIG. 4 is a schematic diagram of an antenna array interface and discriminator consistent with the present disclosure. More specifically, FIG. 4 depicts an exemplary topology for the generation of sum and difference, and Horizontal and Vertical outputs from antenna array 101. In an exemplary embodiment, antenna array 101 includes both first antenna array 401 (which may be a "left half" array) and second antenna array 402 (which may be a "right half" array). First antenna array 401 is depicted with channel 405, which may correspond to a V polarization component, and channel 407, which may correspond to an H polarization component. Second antenna array 402 is depicted with channel 406, which may correspond to a V polarization component, and channel 408, which may correspond to an H polarization component. Channels 405, 406, 407, and 408 may carry both signals for transmission from first antenna array 401 and second antenna array 402, and signals received by first antenna array 401 and second antenna array 402.

Magic tee 411 and magic tee 412 are coupled as shown to (respectively) channels 405 and 406, and channels 407 and 408. In an exemplary embodiment, accordingly, magic tee 411 handles signals associated with a V polarization component, and magic tee 412 handles signals associated with a H polarization component. Channel 417 is associated with the "sum" node of magic tee 411, and channel 418 is associated with the "sum" node of magic tee 412. Likewise, in an exemplary embodiment, channel 415 is associated with the "difference" node of magic tee 411, and channel 418 is associated with the "difference" node of magic tee 412. Transmission rejection filter 421 ensures that the signal over channel 415 is a "received" signal only. Likewise, transmission rejection filter 422 ensures that the signal over channel 416 is a "received" signal only. Conversely, diplexer 431 is able to maintain both transmission channel 475 and the receiving channel which is coupled to LNA 441. Similarly, diplexer 432 is able to maintain both transmission channel 476 and the receiving channel which is coupled to LNA 442. The received channel associated with the difference value from magic tee 411 passes through LNA 451 to channel 455. Similarly, the received channel associated with the difference value from magic tee 412 passes through LNA 452 to channel 456. The received channel associated with the sum value from magic tee 411 passes through LNA 441 and coupler 461 to channels 465 and 463. Similarly, the received channel associated with the sum value from magic tee 412 passes through LNA 442 and coupler 462 to channels 464 and 466.

Consistent with an exemplary embodiment, accordingly, channel 455, 465 456, and 466 may correspond, respectively, to channels 172, 171, 174, and 173 of FIGS. 1 and 2. Likewise, channels 463, 464, 475, and 476 may correspond, respectively, to channels 163, 164, 161, and 162 of FIG. 1.

For example, in an embodiment consistent with the disclosure, the sum and difference power signals are RF, 10.7 to 12.75 GHz, with amplitudes of nominally −120 to −100 dBm for sum, and −135 to −95 for difference. The indicated amplitude range is based on the sum-difference signal paths having amplification (LNA) in the reception paths.

Further still, consistent with an embodiment, the G/T for the sum outputs may match conventional antenna array panel specifications: 11.7 dB/K. Consistent with an embodiment, the difference outputs may provide a smaller value for G/T: 11.2 to 11.5 dB/K. The above recited output signal levels include an LNA with about 30 dB of gain for the difference signal. The sum signal has a −10 dB coupler from the LNA amplified signal.

In an embodiment consistent with the disclosure, motion controller 102 may generate a current antenna array 101 position and motion (rate) in elevation and azimuth based on current (n) IMU 120 inputs. The IMU 120 rate inputs from the next sample (n+1) will be converted to azimuth and elevation and then compared to the azimuth rate in use from sample (n). The difference output from channels 172 and 174, as analyzed by sum-delta processor 130, may determine a direction associated with the OBA. Further, sum-delta processor 130 may determine OBA error magnitude. As the separation between the sum values and the difference value decreases, an inertial pointing direction solution may include a correction factor added to eliminate systematic errors in the pointing. As the separation between the sum values and the difference value increases, the magnitude and direction may be used to correct the rate command and drive the antenna array to an exact on-target solution.

Figure 5:
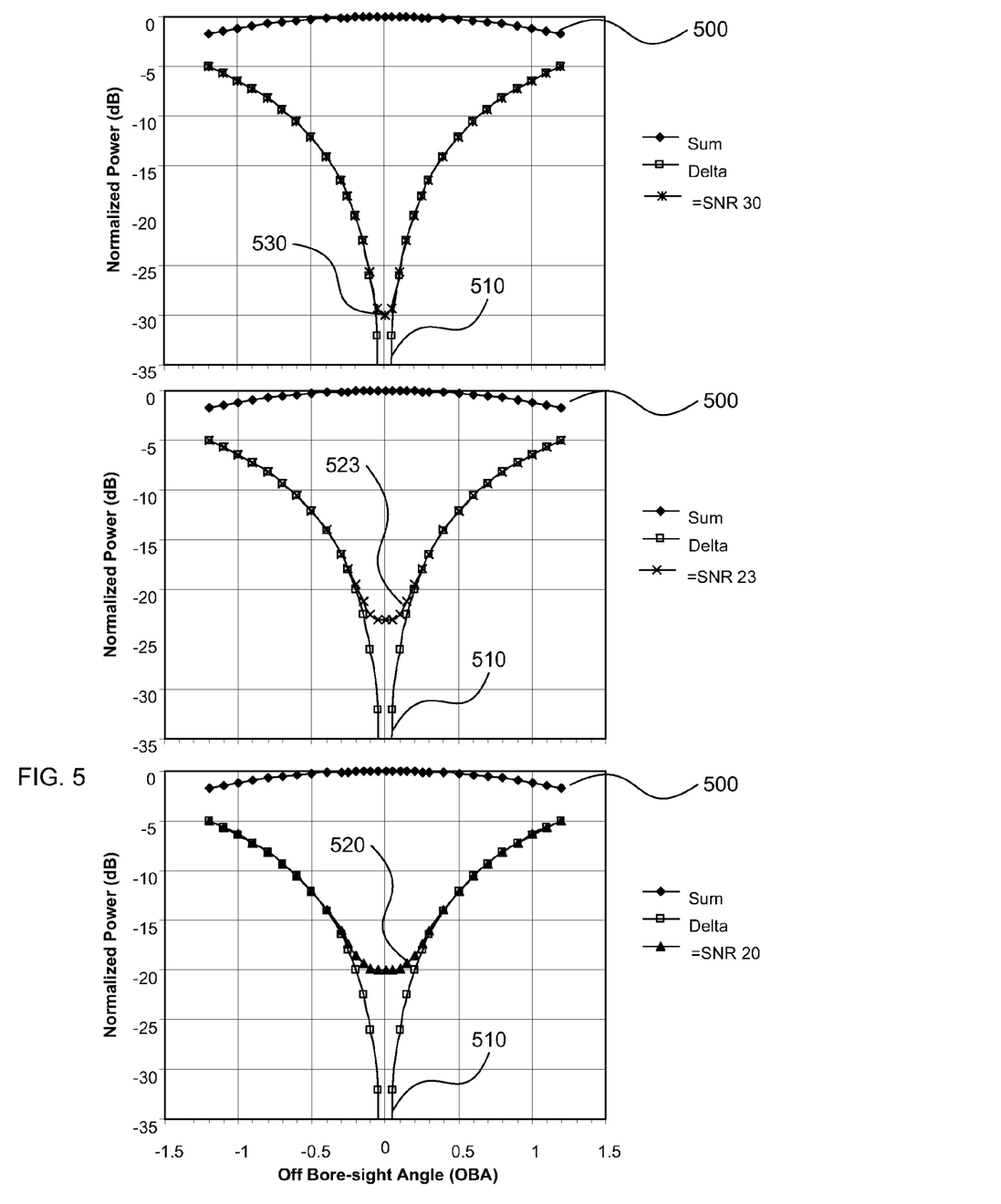
FIG. 5 depicts several plots of acquired sum RSSI values and difference RSSI values, converted to a normalized power scale with the peak at the maximum of the sum RSSI values, and associated with various signal-to-noise values.

The difference between the sum power values and the difference power values as derived from RSSI values is depicted in FIG. 5. In particular, FIG. 5 depicts several plots of acquired sum RSSI values and difference RSSI values, converted to a normalized power scale with the peak at the maximum of the sum RSSI values, and associated with various signal-to-noise values. As depicted in FIG. 5, a decrease in the difference between a sum value (curve 500) and a difference value (curve 510) indicates an increasing OBA. Conversely, an increase in the difference between a sum value (curve 500) and a difference value (curve 510) indicates a decreasing OBA. Moreover, the sign of the difference value indicates the direction of the offset. Further still, difference curves associated with various signal to noise ratios are depicted (curves 520, 523, and 530). Curve 510 represents an ideal measurement (i.e., maximal signal-to-noise). Curves 520, 523, and 530 represent departures from the ideal curve 510.

The general equation that describes the azimuth accuracy at each OBA position as a function of signal to noise (SNR) is given as:

$$\sigma(\theta) = \frac{\sqrt{1+9\mu^2\left(\frac{\theta}{\theta_B}\right)^2}}{3\mu\sqrt{2SNR}}\theta_B$$

Where $\theta_B$=the 3 dB antenna beam width, and $\mu$=the gain factor for the difference beam (usually has the value of 0.7 to 0.3). In a preferred embodiment, the gain factor can be 0.5.

Figure 6:
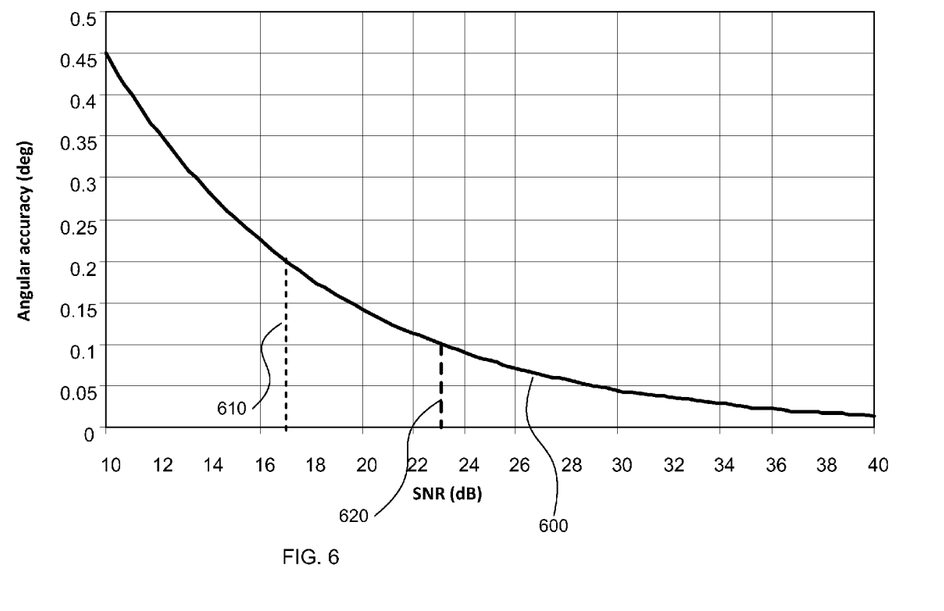
FIG. 6 depicts a plot of angular accuracy as a function of signal-to-noise.

FIG. 6 depicts a plot of angular accuracy (curve 600) as a function of signal-to-noise (SNR), with an exemplary antenna beam width of 3 degrees. As the SNR increases in curve 600, the level of ambiguity for angular accuracy decreases. The minimum 0.2 deg required accuracy for FCC compliance is depicted by line 610 which relates to SNR of 17 dB. To achieve a level of ambiguity of 0.1 deg a SNR of 22 dB would be required (line 620).

Figure 7:
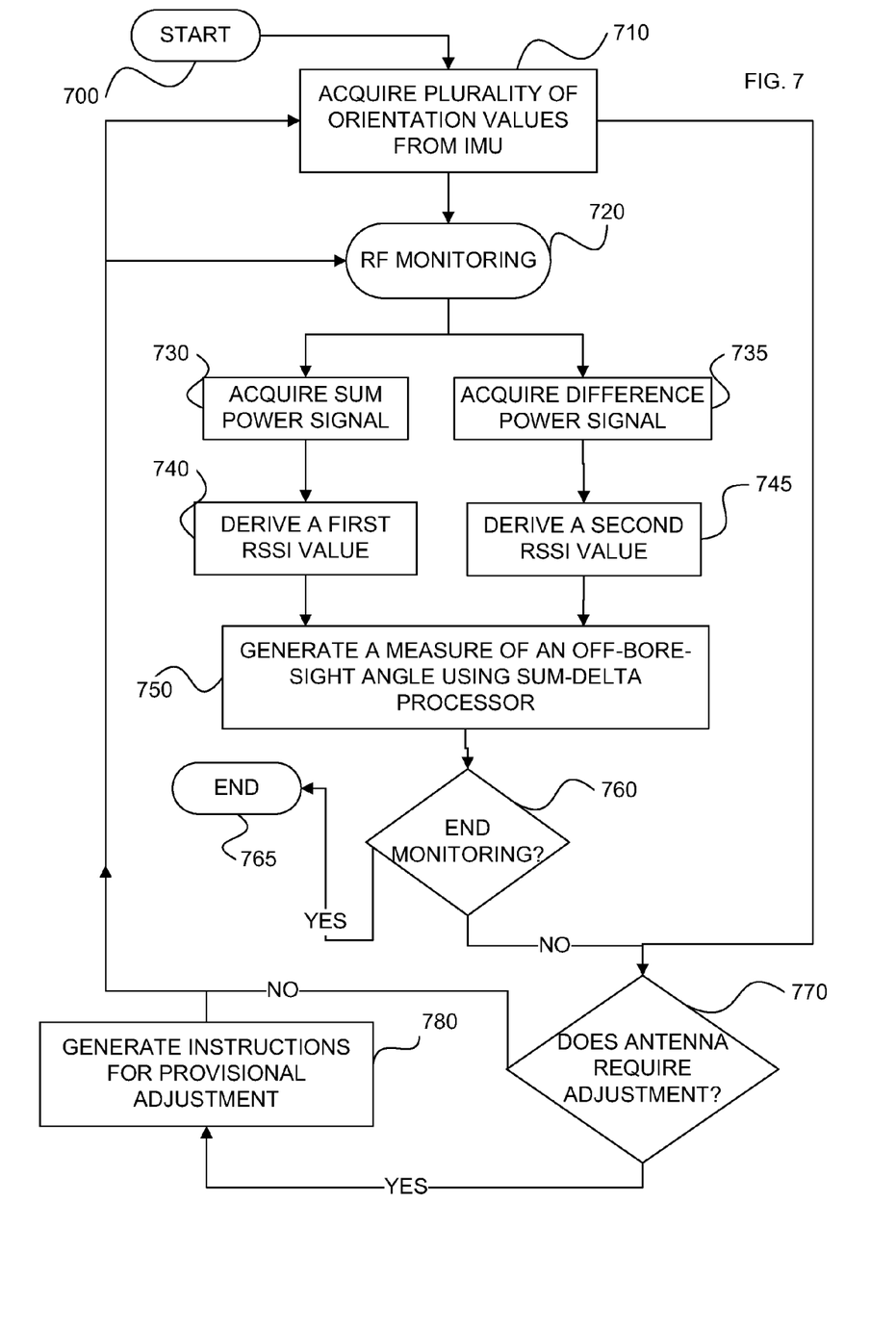
FIG. 7 is a flow chart of an exemplary process of monitoring and controlling alignment, consistent with the present disclosure.

FIG. 7 is a flow chart of an exemplary process of monitoring and controlling alignment, consistent with the present disclosure and the embodiments of FIGS. 1-4. Note that although certain of the steps in FIG. 7 may be depicted herein as being carried out in a particular order, it will be appreciated that the depicted order is in no way limiting of the disclosure or the appended claims. For example, step 760 in FIG. 7 relates to a determination as to whether to stop monitoring the angular orientation of antenna array 101 relative to a remote source. Although step 760 is depicted as occurring prior to step 770, which relates to determining whether the antenna orientation requires adjustment, one would appreciate—consistent with the disclosure—that step 760 does not necessarily have to occur prior to step 770.

In connection with the plurality of orientation values that are acquired in step 710 from IMU 120, step 720 relates to the initiation of RF monitoring. For example, in a preferred embodiment where antenna array 101 is affixed to a commercial airliner, for example, all of the steps depicted in FIG. 7 may be performed when the airliner is in transit.

Steps 730 and 735 relate to the acquisition of a sum power signal and a difference power signal. In an exemplary embodiment, the sum power signal and the difference power signal may be acquired from magic tee structure 411 or 412.

Steps 740 and 745 relate to the derivation of a first RSSI value associated with the sum power signal and the derivation of a second RSSI value associated with a difference power signal. In an exemplary embodiment, the first RSSI value and the second RSSI value are generated from RSSI circuit 251 and RSSI circuit 253.

Step 750 relates to the generation of a measure of an off-bore-sight angle (OBA) using the first RSSI value and the second RSSI value. In an exemplary embodiment, a measure of the OBA is calculated by sum-delta processor 130 and/or two-channel sum-delta processor 230.

Step 760 simply relates to a decision to cease monitoring. For example, such a decision may be useful for a variety of external reasons—such as after a commercial airliner is no longer in transit.

Step 770 relates to a decision as to whether the antenna array requires adjustment as a result of the RF monitoring by sum-delta processor 130 or two-channel sum-delta processor 230. In an exemplary embodiment, such a decision may also be performed by sum-delta processor 130 or two-channel sum-delta processor 230, or this decision may be made by motion controller 102 in response to the OBA measure generated by sum-delta processor 130 or two-channel sum-delta processor 230. Consistent with an exemplary embodiment, this decision may be made in connection with the orientation values that are acquired by IMU 120.

In the event that adjustment is required, then instructions for a provisional adjustment may be generated and provided to azimuth drive 109. In the event that an adjustment is not necessary (again, set against the continuing adjustments that may be required in view of the information from IMU 120), then additional RF steering instructions need not be generated, and the monitoring of both values generated by IMU 120 (step 710) and RF monitoring (step 720) may continue.

As described herein, the present disclosure relates to a satellite tracking apparatus and control method for a dual axis elevation over azimuth positioner control of an array of horn antennas for aviation applications. The apparatus and control utilizes the on board Inertial Navigation System (INS) and compensates for the airframe bending and twisting as well as correction for mounting errors. The low profile horn array has adequate gain and G/T for low profile, low drag requirements suitable for aviation applications. The control system utilizes both beacon and partial (or whole) transponder emissions originating from the satellite for tracking signals.

In a further embodiment, a Beacon polarization can be commanded from the SMU along with the frequency. Analysis of such data may allow the system to calculate the best source of sum-difference data: the vertical or horizontal antenna outputs.

Additional functions that can be implemented in system 100 consistent with the present disclosure include an envelope detector, a narrow bandwidth tracking filter, a (Difference value)/(Sum value) ratio, and noise reduction filtering (20 dB S/N gain). In addition, a Doppler frequency shift calculation may be implemented, such as in antenna controller 107.

Other embodiments consistent with the invention and the disclosure will be apparent to those skilled in the art from consideration of the specification and practice of the embodiments disclosed herein. For example, although the disclosure has included embodiments directed to the use of antenna assembly on a commercial plane for purposes of providing in-flight services without interruption, the embodiments disclosed herein may also be used outside the context of in-flight services. For example, the disclosed embodiments permit systems that utilize inertial navigation systems to correct for any "drift" error that may accrue in the inertial navigation system's alignment information. Under operation as disclosed herein, the physical orientation of antenna array 101 may be maintained towards a geostationary satellite—this providing an inertial navigation system with independent alignment information.

It is intended that the specification and examples be considered as exemplary only, with a true scope and spirit of the invention being indicated by the following claims. For example, while exemplary embodiments of the present invention described above involve systems configured for use with aircraft, other embodiments may be configured for use with other mobile vehicles such as automobiles and ships.

What is claimed is:

1. A method of monitoring angular orientation, comprising:

acquiring a sum power signal from a sum combination of a first signal output of an antenna array and a second signal output of the antenna array;

acquiring a difference power signal from a difference combination of the first signal output of the antenna array and the second signal output of the antenna array;

deriving a first received signal strength indication value associated with the sum power signal and associated with approximately a first time;

deriving a second received signal strength indication value associated with the difference power signal and associated with approximately the first time;

utilizing the first received signal strength indication value and the second received signal strength indication value to generate a first measure of an off-bore-sight angle of the antenna array relative to a position of a transmitting radiofrequency signal source at approximately the first time;

where the antenna array comprises a first antenna portion and a second antenna portion;

where the first antenna portion is configured to couple to radiofrequency radiation transmitted from the transmitting radiofrequency signal source and provide the first signal output; and where the second antenna portion is configured to couple to radiofrequency radiation transmitted from the transmitting radiofrequency signal source and provide the second signal output.

2. The method of monitoring angular orientation of claim 1, further comprising:

deriving a third received signal strength indication value associated with the sum power signal and associated with approximately a second time;

deriving a fourth received signal strength indication value associated with the difference power signal and associated with approximately the second time; and where the step of utilizing the first received signal strength indication value and the second received signal strength indication value further comprises:

generating a second measure of a difference of the third received signal strength indication value and the fourth received signal strength indication value;

generating a third measure of a difference of the first received signal strength indication value and the second received signal strength indication value; and comparing the third measure and the second measure to determine whether the off-bore-sight angle at approximately the first time is at least one of: approximately the same as an off-bore-sight angle at approximately the second time; greater than the off-bore-sight angle at approximately the second time; and less than the off-bore-sight angle at approximately the second time; and where the second time is different from the first time.

3. The method of monitoring angular orientation of claim 1,
where the radiofrequency radiation comprises a first component of radiofrequency radiation polarized in a first direction;
where the first signal output is associated with the first component of radiofrequency radiation polarized in the first direction coupled to the first antenna portion; and
where the second signal output is associated with the first component of radiofrequency radiation polarized in the first direction coupled to the second antenna portion.

4. The method of monitoring angular orientation of claim 3,
where the first component of radiofrequency radiation polarized in a first direction is a Horizontal (H) polarization component.

5. The method of monitoring angular orientation of claim 3,
where the first component of radiofrequency radiation polarized in a first direction is a Vertical (V) polarization component.

6. The method of monitoring angular orientation of claim 2,
where the radiofrequency radiation comprises a first component of radiofrequency radiation polarized in a first direction;
where the first signal output is associated with the first component of radiofrequency radiation polarized in the first direction coupled to the first antenna portion; and
where the second signal output is associated with the first component of radiofrequency radiation polarized in the first direction coupled to the second antenna portion.

7. The method of monitoring angular orientation of claim 6,
where the first component of radiofrequency radiation polarized in a first direction is a Horizontal (H) polarization component.

8. The method of monitoring angular orientation of claim 6,
where the first component of radiofrequency radiation polarized in a first direction is a Vertical (V) polarization component.

9. The method of monitoring angular orientation of claim 1,
where the first antenna portion comprises at least a first antenna;
where the second antenna portion comprises at least a second antenna; and
where the first antenna is spaced apart from the second antenna.

10. The method of monitoring angular orientation of claim 2,
where the first antenna portion comprises at least a first antenna;
where the second antenna portion comprises at least a second antenna; and
where the first antenna is spaced apart from the second antenna.

11. The method of monitoring angular orientation of claim 1, where the step of acquiring a sum power signal from a sum combination of a first signal output of an antenna array and a second signal output of the antenna array comprises:
acquiring the sum power signal from a magic tee structure coupled to the first signal output of the antenna array and the second signal output of the antenna array; and
where the step of acquiring a difference power signal from a difference combination of the first signal output of an antenna array and the second signal output of the antenna array comprises:
acquiring the difference power signal from the magic tee structure.

12. The method of monitoring angular orientation of claim 2, where the step of acquiring a sum power signal from a sum combination of a first signal output of an antenna array and a second signal output of the antenna array comprises:
acquiring the sum power signal from a magic tee structure coupled to the first signal output of the antenna array and the second signal output of the antenna array; and
where the step of acquiring a difference power signal from a difference combination of the first signal output of the antenna array and the second signal output of the antenna array comprises:
acquiring the difference power signal from the magic tee structure.

13. The method of monitoring angular orientation of claim 1:
where the transmitting radiofrequency signal source is a satellite.

14. The method of monitoring angular orientation of claim 13:
where the satellite is a geostationary satellite; and
where the antenna array is affixed to a vehicle capable of motion relative to the satellite.

15. The method of monitoring angular orientation of claim 2:
where the transmitting radiofrequency signal source is a satellite.

16. The method of monitoring angular orientation of claim 15:
where the satellite is a geostationary satellite; and
where the antenna array is affixed to a vehicle capable of motion relative to the satellite.

17. A method of controlling angular orientation comprising;
the method of monitoring angular orientation of claim 1;
utilizing the first measure of the off-bore-sight angle of the antenna array relative to the position of the transmitting radiofrequency signal source at approximately the first time to generate radiofrequency steering instructions for an antenna motion controller;
where the antenna motion controller is responsive to the radiofrequency steering instructions, and is further configured to cause the antenna array to exhibit a provisional off-bore-sight angle relative to the position of the transmitting radiofrequency signal source that is different from the off-bore-sight angle of the antenna array relative to the position of the transmitting radiofrequency signal source at approximately the first time.

18. The method of controlling angular orientation of claim 17, further comprising:
acquiring a plurality of orientation values from an inertial measurement unit affixed to a vehicle;
where the antenna array is affixed to the vehicle.

19. The method of controlling angular orientation of claim 18:

where the transmitting radiofrequency signal source is a satellite.

20. The method of controlling angular orientation of claim 19:
where the satellite is a geostationary satellite; and
where the vehicle is capable of motion relative to the satellite.

21. A method of controlling angular orientation comprising;
the method of monitoring angular orientation of claim 2;
utilizing the first measure of the off-bore-sight angle of the antenna array relative to the position of the transmitting radiofrequency signal source at approximately the first time to generate radiofrequency steering instructions for an antenna motion controller;
where the antenna motion controller is responsive to the radiofrequency steering instructions, and is further configured to cause the antenna array to exhibit a provisional off-bore-sight angle relative to the position of the transmitting radiofrequency signal source that is different from the off-bore-sight angle of the antenna array relative to the position of the transmitting radiofrequency signal source at approximately the first time.

22. The method of controlling angular orientation of claim 21, further comprising:
acquiring a plurality of orientation values from an inertial measurement unit affixed to a vehicle;
where the antenna array is affixed to the vehicle.

23. The method of controlling angular orientation of claim 22:
where the transmitting radiofrequency signal source is a satellite.

24. The method of controlling angular orientation of claim 23:
where the satellite is a geostationary satellite; and
where the vehicle is capable of motion relative to the satellite.

25. An angular orientation system, comprising:
an antenna array comprising a first antenna portion and a second antenna portion;
a sum-difference structure coupled to a first output and a second output, the sum-difference structure configured to provide a sum power signal and a difference power signal;
an RSSI circuit configured to generate a first received signal strength indication value associated with the sum power signal, the RSSI circuit further configured to generate a second received signal strength indication value associated with the difference power signal; and
a sum-delta processor configured to utilize the first received signal strength indication value and the second received signal strength indication value to generate a first measure of an off-bore-sight angle of the antenna array relative to a position of a transmitting radiofrequency signal source;
where the first antenna portion is configured to couple to radiofrequency radiation transmitted from the transmitting radiofrequency signal source and to provide the first signal output; and
where the second antenna portion is configured to couple to radiofrequency radiation transmitted from the transmitting radiofrequency signal source and to provide the second signal output.

26. The angular orientation system of claim 25,
where the RSSI circuit comprises a first RSSI circuit coupled to a first low noise block, and a second RSSI circuit coupled to a second low noise block; and where the first RSSI circuit is configured to generate the first received signal strength indication value and the second RSSI circuit is configured to generate the second received signal strength indication value.

27. The angular orientation system of claim 25,
where the RSSI circuit is configured to generate a third received signal strength indication value associated with the sum power signal at approximately a first time, and the RSSI circuit is further configured to generate a fourth received signal strength indication value associated with the difference power signal at approximately a first time;
the angular orientation system further comprising:
a memory configured to store a second measure of a difference of the third received signal strength indication value and the fourth received signal strength indication value.

28. The angular orientation system of claim 27,
where the sum-delta processor is further configured to acquire the second measure from the memory; and
where the sum-delta processor is configured to generate a third measure of a difference of the first received signal strength indication value and the second received signal strength indication value and compare the third measure and the second measure to determine whether an off-bore-sight angle at approximately the first time is at least one of: approximately the same as the off-bore-sight angle associated with the first measure; greater than the off-bore-sight angle associated with the first measure; and less than the off-bore-sight angle at associated with the first measure.

29. The angular orientation system of claim 25,
where the transmitting radiofrequency signal source is a satellite.

30. The angular orientation system of claim 29:
where the satellite is a geostationary satellite; and
where the antenna array is affixed to a vehicle capable of motion relative to the satellite.

31. The angular orientation system of claim 25,
where the first antenna portion comprises at least a first antenna;
where the second antenna portion comprises at least a second antenna; and
where the first antenna is spaced apart from the second antenna.

32. The angular orientation system of claim 25,
where the radiofrequency radiation comprises a first component of radiofrequency radiation polarized in a first direction;
where first signal output is associated with the first component of radiofrequency radiation polarized in the first direction coupled to the first antenna portion; and
where the second signal output is associated with the first component of radiofrequency radiation polarized in the first direction coupled to the second antenna portion.

33. The angular orientation system of claim 32,
where the first component of radiofrequency radiation polarized in a first direction is a Horizontal (H) polarization component.

34. The angular orientation system of claim 32,
where the first component of radiofrequency radiation polarized in a first direction is a Vertical (V) polarization component.

35. An angular orientation system, comprising:
an antenna array comprising a first antenna portion and a second antenna portion;

a first sum-difference structure coupled to a first output and a second output, the first sum-difference structure configured to provide a first sum power signal and a first difference power signal;

a second sum-difference structure coupled to a third output and a fourth output, the second sum-difference structure configured to provide a second sum power signal and a second difference power signal;

a polarization controller configured to select at least one of the first sum power signal and the second sum power signal to provide a selected sum power signal, the polarization controller further configured to select at least one of the first difference power signal and the second difference power signal to provide a selected difference power signal;

an RSSI circuit configured to generate a first received signal strength indication value associated with the selected sum power signal, the RSSI circuit further configured to generate a second received signal strength indication value associated with the selected difference power signal; and a sum-delta processor configured to utilize the first received signal strength indication value and the second received signal strength indication value to generate a first measure of an off-bore-sight angle of the antenna array relative to a position of a transmitting radiofrequency signal source that transmits radiofrequency radiation;

where the radiofrequency radiation comprises a first component of radiofrequency radiation polarized in a first direction and a second component of radiofrequency radiation polarized in a second direction;

where first signal output is associated with the first component of radiofrequency radiation polarized in the first direction coupled to the first antenna portion;

where the second signal output is associated with the first component of radiofrequency radiation polarized in the first direction coupled to the second antenna portion;

where third signal output is associated with the second component of radiofrequency radiation polarized in the second direction coupled to the first antenna portion; and where the fourth signal output is associated with the second component of radiofrequency radiation polarized in the second direction coupled to the second antenna portion.

36. The angular orientation system of claim 35,
where the first component of radiofrequency radiation polarized in a first direction is a Horizontal (H) polarization component; and
where the second component of radiofrequency radiation polarized in a second direction is a Vertical (V) polarization component.

37. The angular orientation system of claim 35,
where the RSSI circuit comprises a first RSSI circuit coupled to a first low noise block, and a second RSSI circuit coupled to a second low noise block; and
where the first RSSI circuit is configured to generate the first received signal strength indication value and the second RSSI circuit is configured to generate the second received signal strength indication value.

38. The angular orientation system of claim 35,
where the transmitting radiofrequency signal source is a satellite.

39. The angular orientation system of claim 38:
where the satellite is a geostationary satellite; and
where the antenna array is affixed to a vehicle capable of motion relative to the satellite.

40. The angular orientation system of claim 35,
where the first antenna portion comprises at least a first antenna;
where the second antenna portion comprises at least a second antenna; and
where the first antenna is spaced apart from the second antenna.

41. The angular orientation system of claim 25, further comprising;
an antenna motion controller, responsive to radiofrequency steering instructions, and configured to cause the antenna array to exhibit a provisional off-bore-sight angle relative to the position of the transmitting radiofrequency signal source that is different from the off-bore-sight angle of the antenna array associated with the first measure.

42. The angular orientation system of claim 41, further comprising;
an inertial measurement unit affixed to a vehicle;
an antenna controller configured to acquire a plurality of orientation values from the inertial measurement unit and to generate inertial steering instructions; and
where the antenna motion controller is further responsive to inertial steering instructions.

43. The angular orientation system of claim 25,
where the sum-difference structure comprises a magic tee structure.

44. The angular orientation system of claim 42,
where the transmitting radiofrequency signal source is a satellite.

45. The angular orientation system of claim 44:
where the satellite is a geostationary satellite; and
where the antenna array is affixed to the vehicle.

46. The angular orientation system of claim 35, further comprising;
an antenna motion controller, responsive to radiofrequency steering instructions, and configured to cause the antenna array to exhibit a provisional off-bore-sight angle relative to the position of the transmitting radiofrequency signal source that is different from the off-bore-sight angle of the antenna array associated with the first measure.

47. The angular orientation system of claim 46, further comprising;
an inertial measurement unit affixed to a vehicle;
an antenna controller configured to acquire a plurality of orientation values from the inertial measurement unit and to generate inertial steering instructions; and
where the antenna motion controller is further responsive to inertial steering instructions.

48. The angular orientation system of claim 35,
where the first sum-difference structure comprises a first magic tee structure.

49. The angular orientation system of claim 48,
where the second sum-difference structure comprises a second magic tee structure.

50. The angular orientation system of claim 46,
where the transmitting radiofrequency signal source is a satellite.

51. The angular orientation system of claim 50:
where the satellite is a geostationary satellite; and
where the antenna array is affixed to the vehicle.

52. A computer-readable storage medium including instructions, executable by a processor, for performing a method of monitoring angular orientation of an antenna array,
where the antenna array comprises a first antenna portion and a second antenna portion;

where the first antenna portion is configured to couple to radiofrequency radiation transmitted from a transmitting radiofrequency signal source and provide a first signal output, and where the second antenna portion is configured to couple to radiofrequency radiation transmitted from the transmitting radiofrequency signal source and provide a second signal output; the method of monitoring angular orientation comprising:

acquiring a sum power signal from a sum combination of the first signal output of the antenna array and the second signal output of the antenna array;

acquiring a difference power signal from a difference combination of the first signal output of the antenna array and the second signal output of the antenna array;

deriving a first received signal strength indication value associated with the sum power signal and associated with approximately a first time;

deriving a second received signal strength indication value associated with the difference power signal and associated with approximately the first time;

utilizing the first received signal strength indication value and the second received signal strength indication value to generate a first measure of an off-bore-sight angle of the antenna array relative to a position of the transmitting radiofrequency signal source at approximately the first time.

53. The computer-readable storage medium of claim 52, where the method of monitoring angular orientation further comprises:

deriving a third received signal strength indication value associated with the sum power signal and associated with approximately a second time;

deriving a fourth received signal strength indication value associated with the difference power signal and associated with approximately the second time; and where the step of utilizing the first received signal strength indication value and the second received signal strength indication value further comprises:

generating a second measure of a difference of the third received signal strength indication value and the fourth received signal strength indication value;

generating a third measure of a difference of the first received signal strength indication value and the second received signal strength indication value; and comparing the third measure and the second measure to determine whether the off-bore-sight angle at approximately the first time is at least one of: approximately the same as an off-bore-sight angle at approximately the second time; greater than the off-bore-sight angle at approximately the second time; and less than the off-bore-sight angle at approximately the second time; and where the second time is different from the first time.

54. The computer-readable storage medium of claim 52, where the radiofrequency radiation comprises a first component of radiofrequency radiation polarized in a first direction;

where first signal output is associated with the first component of radiofrequency radiation polarized in the first direction coupled to the first antenna portion; and where the second signal output is associated with the first component of radiofrequency radiation polarized in the first direction coupled to the second antenna portion.

55. The computer-readable storage medium of claim 54, where the first component of radiofrequency radiation polarized in a first direction is a Horizontal (H) polarization component.

56. The computer-readable storage medium of claim 54, where the first component of radiofrequency radiation polarized in a first direction is a Vertical (V) polarization component.

57. The computer-readable storage medium of claim 53, where the radiofrequency radiation comprises a first component of radiofrequency radiation polarized in a first direction;

where first signal output is associated with the first component of radiofrequency radiation polarized in the first direction coupled to the first antenna portion; and where the second signal output is associated with the first component of radiofrequency radiation polarized in the first direction coupled to the second antenna portion.

58. The computer-readable storage medium of claim 57, where the first component of radiofrequency radiation polarized in a first direction is a Horizontal (H) polarization component.

59. The computer-readable storage medium of claim 57, where the first component of radiofrequency radiation polarized in a first direction is a Vertical (V) polarization component.

60. The computer-readable storage medium of claim 52, where the first antenna portion comprises at least a first antenna;

where the second antenna portion comprises at least a second antenna; and where the first antenna is spaced apart from the second antenna.

61. The computer-readable storage medium of claim 53, where the first antenna portion comprises at least a first antenna;

where the second antenna portion comprises at least a second antenna; and where the first antenna is spaced apart from the second antenna.

62. The computer-readable storage medium of claim 52, where the step of acquiring a sum power signal from a sum combination of the first signal output of the antenna array and the second signal output of the antenna array comprises:

acquiring the sum power signal from a magic tee structure coupled to the first signal output of the antenna array and the second signal output of the antenna array; and where the step of acquiring a difference power signal from a difference combination of the first signal output of the antenna array and the second signal output of the antenna array comprises:

acquiring the difference power signal from the magic tee structure.

63. The computer-readable storage medium of claim 53, where the step of acquiring a sum power signal from a sum combination of the first signal output of the antenna array and the second signal output of the antenna array comprises:

acquiring the sum power signal from a magic tee structure coupled to the first signal output of the antenna array and the second signal output of the antenna array; and where the step of acquiring a difference power signal from a difference combination of the first signal output of the antenna array and the second signal output of the antenna array comprises:

acquiring the difference power signal from the magic tee structure.

64. The computer-readable storage medium of claim 52, where the transmitting radiofrequency signal source is a satellite.

65. The computer-readable storage medium of claim 64, where the satellite is a geostationary satellite; and
where the antenna array is affixed to a vehicle capable of motion relative to the satellite.

66. The computer-readable storage medium of claim 53, where the transmitting radiofrequency signal source is a satellite.

67. The computer-readable storage medium of claim 66, where the satellite is a geostationary satellite; and
where the antenna array is affixed to a vehicle capable of motion relative to the satellite.

68. The computer-readable storage medium of claim 52,
where the antenna array is coupled to an antenna motion controller, responsive to radiofrequency steering instructions, where the antenna motion controller is further configured to cause the antenna array to exhibit a provisional off-bore-sight angle relative to the position of the transmitting radiofrequency signal source that is different from the off-bore-sight angle of the antenna array relative to the position of the transmitting radiofrequency signal source at approximately the first time;
the computer-readable storage medium further comprising instructions, executable by the processor, for performing a method of controlling angular orientation, the method of controlling angular orientation comprising:
utilizing the first measure of the off-bore-sight angle of the antenna array relative to the position of the transmitting radiofrequency signal source at approximately the first time to generate radiofrequency steering instructions for the antenna motion controller.

69. The computer-readable storage medium of claim 68, where the method of controlling angular orientation further comprises:
acquiring a plurality of orientation values from an inertial measurement unit affixed to a vehicle;
where the antenna array is affixed to the vehicle.

70. The computer-readable storage medium of claim 69, where the transmitting radiofrequency signal source is a satellite.

71. The computer-readable storage medium of claim 70:
where the satellite is a geostationary satellite; and
where the vehicle is capable of motion relative to the satellite.

72. The computer-readable storage medium of claim 53,
where the antenna array is coupled to an antenna motion controller, responsive to radiofrequency steering instructions, where the antenna motion controller is further configured to cause the antenna array to exhibit a provisional off-bore-sight angle relative to the position of the transmitting radiofrequency signal source that is different from the off-bore-sight angle of the antenna array relative to the position of the transmitting radiofrequency signal source at approximately the first time;
the computer-readable storage medium further comprising instructions, executable by the processor, for performing a method of controlling angular orientation, the method of controlling angular orientation comprising:
utilizing the first measure of the off-bore-sight angle of the antenna array relative to the position of the transmitting radiofrequency signal source at approximately the first time to generate radiofrequency steering instructions for the antenna motion controller.

73. The computer-readable storage medium of claim 72, where the method of controlling angular orientation further comprises:
acquiring a plurality of orientation values from an inertial measurement unit affixed to a vehicle;
where the antenna array is affixed to the vehicle.

74. The computer-readable storage medium of claim 73, where the transmitting radiofrequency signal source is a satellite.

75. The computer-readable storage medium of claim 74, where the satellite is a geostationary satellite; and
where the vehicle is capable of motion relative to the satellite.

\* \* \* \* \*